US012555258B2

United States Patent
Seo et al.

(10) Patent No.: US 12,555,258 B2
(45) Date of Patent: Feb. 17, 2026

(54) METHOD AND APPARATUS WITH SYMMETRY DETECTION

(71) Applicants: SAMSUNG ELECTRONICS CO., LTD., Suwon-si (KR); POSTECH Research and Business Development Foundation, Pohang-si (KR)

(72) Inventors: Ahyun Seo, Pohang-si (KR); Minsu Cho, Pohang-si (KR); Suha Kwak, Pohang-si (KR); Byungjin Kim, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 303 days.

(21) Appl. No.: 18/342,236

(22) Filed: Jun. 27, 2023

(65) Prior Publication Data

US 2024/0161326 A1    May 16, 2024

(30) Foreign Application Priority Data

Nov. 11, 2022    (KR) .................. 10-2022-0150878

(51) Int. Cl.
| | |
|---|---|
| G06T 7/68 | (2017.01) |
| G06V 10/764 | (2022.01) |
| G06V 10/77 | (2022.01) |
| G06V 10/774 | (2022.01) |
| G06V 10/82 | (2022.01) |

(52) U.S. Cl.
CPC ............. *G06T 7/68* (2017.01); *G06V 10/764* (2022.01); *G06V 10/7715* (2022.01); *G06V 10/774* (2022.01); *G06V 10/82* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,494,297 B2 * | 7/2013 | Zhang | G06V 10/42 |
| | | | 382/254 |
| 2008/0021502 A1 * | 1/2008 | Imielinska | G06T 7/0012 |
| | | | 607/1 |

(Continued)

FOREIGN PATENT DOCUMENTS

| | | |
|---|---|---|
| CN | 112257753 A | 1/2021 |
| CN | 113033677 A | 6/2021 |

(Continued)

OTHER PUBLICATIONS

Funk et al., "Beyond Planar Symmetry: Modeling human perception of reflection and rotation symmetries in the wild," arXiv:1704.03568v2 [cs.CV] Aug. 28, 2017 (Year: 2017).*

(Continued)

*Primary Examiner* — Soo Shin
(74) *Attorney, Agent, or Firm* — NSIP Law

(57) ABSTRACT

A method may include predicting, using a machine learning model, score maps for each of a plurality of pre-set classes for predetermined symmetry types, using a plurality of pixels included in the feature map, and detecting a symmetry element of the input image based on the predicted score maps.

23 Claims, 6 Drawing Sheets

(56) References Cited

U.S. PATENT DOCUMENTS

| | | | |
|---|---|---|---|
| 2017/0256465 A1* | 9/2017 | Van Leest | G03F 9/7003 |
| 2019/0155173 A1* | 5/2019 | Tsiatmas | G03F 7/70633 |
| 2021/0150757 A1 | 5/2021 | Mustikovela et al. | |
| 2021/0406610 A1 | 12/2021 | Moskalev et al. | |
| 2022/0309773 A1* | 9/2022 | Herman | G06N 3/08 |

FOREIGN PATENT DOCUMENTS

| | | |
|---|---|---|
| CN | 113723472 A | 11/2021 |
| KR | 10-2004-0064825 A | 7/2004 |
| KR | 10-2017-0115078 A | 10/2017 |
| WO | WO 2017/142397 A1 | 8/2017 |

OTHER PUBLICATIONS

Liu et al., "Symmetry Detection from RealWorld Images Competition 2013: Summary and Results," 2013 IEEE Conference on Computer Vision and Pattern Recognition Workshops (Year: 2013).*

Liu, Jingchen, et al., "Symmetry Detection from Real World Images Competition 2013: Summary and Results," Proceedings of the IEEE Conference on Computer Vision and Pattern Recognition Workshops, 2013, (p. 200-205).

Funk, Christopher, et al., "Beyond Planar Symmetry: Modeling Human Perception of Reflection and Rotation Symmetries in The Wild," Proceedings of The IEEE International Conference on Computer Vision, 2017, (p. 793-803).

Weiler, Maurice, et al., "General E(2)-Equivariant Steerable CNNs," 33rd Conference on Neural Information Processing Systems, 2019, (12 Pages in English).

Seo, Ahyun, et al., "Learning to Discover Reflection Symmetry Via Polar Matching Convolution," Proceedings of the IEEE/CVF International Conference on Computer Vision, 2021, (p. 1285-1294).

Han, Jiaming, et al., "ReDet: A Rotation-equivariant Detector for Aerial Object Detection," Proceedings of the IEEE/CVF Conference on Computer Vision and Pattern Recognition, 2021, (p. 2786-2795).

Zhou, Yichao, et al., "NeRD: Neural 3D Reflection Symmetry Detector," Proceedings of the IEEE/CVF Conference on Computer Vision and Pattern Recognition, 2021, (pp. 15940-15949).

Lin, Yancong, et al., "Data-efficient learning for 3D mirror symmetry detection," arXiv:2112.12579v1, Dec. 23, 2021, (11 Pages in English).

Seo, Ahyun, et al., "Reflection and Rotation Symmetry Detection Via Equivariant Learning," Proceedings of the IEEE/CVF Conference on Computer Vision and Pattern Recognition, 2022, (p. 9539-9548).

* cited by examiner

200

210  220  230  240

METHOD AND APPARATUS WITH SYMMETRY DETECTION

CROSS-REFERENCE TO RELATED APPLICATIONS

This application claims the benefit under 35 USC § 119(a) of Korean Patent Application No. 10-2022-0150878, filed on Nov. 11, 2022, in the Korean Intellectual Property Office, the entire disclosure of which is incorporated herein by reference for all purposes.

BACKGROUND

1. Field

The following description relates to a method and apparatus with symmetry detection.

2. Description of Related Art

In the field of performing vision tasks, invariance and equivariance of representation have been recognized as factors that may be considered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including predicting, using machine learning models, score maps for each of a plurality of pre-set classes for predetermined symmetry types, using a plurality of pixels of a feature map extracted from an input image and detecting a symmetry element within the input image based on the predicted score maps.

The method may include extracting the feature map from the input image using a trained equivariant convolution neural network, wherein the machine learning model is another neural network.

The symmetry element may include one of a rotational symmetry point and a reflection symmetry axis.

Multiple classes, of the plurality of preset classes, for detecting the reflection symmetry axis may each be distinctly classified based on an angle forming the reflection symmetry axis.

Multiple classes, of the plurality of preset classes, for detecting the rotational symmetry point may each be distinctly classified based on a number of times a rotational symmetry point overlaps during rotation of the rotational symmetry point.

The predicting of the score maps for each of the plurality of pre-set classes may include predicting the score maps for each of classes, of the plurality of preset classes, presenting a detection of a reflection symmetry axis in the symmetry element and predicting the score maps for each of classes, of the plurality of preset classes, presenting a detection of a feature symmetry point in the symmetry element.

The predicting of the score maps for each of the plurality of pre-set classes may include recording determined pixels related to the predetermined symmetry types in a score map of an applicable class among foreground classes, of the plurality of preset classes, indicating the symmetry element and recording pixels less related, compared to the pixels determined to be related to the predetermined symmetry types, to the predetermined symmetry types in a score map corresponding to a background class, of the plurality of preset classes.

The detecting of the symmetry element within the input image may include detecting the symmetry element by integrating the score maps into one space.

In a general aspect, here is provided a processor-implemented method including predicting score maps for each of a plurality of pre-set classes for predetermined symmetry types based on a plurality of pixels of a feature map extracted from a training image using a first network portion of a neural network, using a distinct second network portion of the neural network, detecting, using a third network portion of the neural network that is distinct from the first network portion and the second network portion, a symmetry element within the training image based on the predicted score maps, and training one of the first network portion, the second network portion, and the third network portion by comparing a symmetry element labeled with respect to the training image to the detected symmetry element.

The symmetry element may include one or more of a rotational symmetry point and a reflection symmetry axis.

The plurality of pre-set classes may each be distinctly classified based on an angle forming the reflection symmetry axis, on a basis of a task detecting the reflection symmetry axis.

The plurality of pre-set classes may each be distinctly classified based on a number of times a rotational symmetry point overlaps during rotation of the rotational symmetry point, on a basis of a task detecting the rotational symmetry points.

The predicting of the score maps for each of the plurality of pre-set classes may include recording pixels related to the predetermined symmetry types in a score map of an applicable class among foreground classes indicating the symmetry element and recording pixels less related to the predetermined symmetry types in a score map corresponding to a background class.

The neural network may include an equivariant convolution neural network.

In a general aspect, here is provided an apparatus including a processor configured to execute a plurality of instructions and a memory storing the plurality of instructions, wherein execution of the plurality of instructions configures the processor to be configured to predict, using a machine learning model, score maps for each of a plurality of pre-set classes of predetermined symmetry types, using a plurality of pixels of a feature map derived from an input image and detect, using another machine learning model, a symmetry element of the input image, based on the predicted score maps.

The deriving of the feature map from the input image may include extracting the feature map from the input image using a trained equivariant convolution neural network.

The symmetry element may include one or more of a rotational symmetry point and a reflection symmetry axis.

The plurality of pre-set classes may each be distinctly classified based on an angle forming the reflection symmetry axis, on a basis of a task detecting the reflection symmetry axis.

The plurality of pre-set classes may each be distinctly classified based on a number of times a rotational symmetry point overlap during rotation of the rotational symmetry point, on a basis of a task detecting the rotational symmetry points.

The predicting of the score maps for each of the plurality of pre-set classes may include predicting the score maps for each of classes, of the plurality of preset classes, presenting a detection of a reflection symmetry axis in the symmetry element and predicting the score maps for each of classes, of the plurality of preset classes, presenting a detection of a feature symmetry point in the symmetry element.

The predicting of the score maps for each of the plurality of pre-set classes may include recording pixels determined to be related to the predetermined symmetry types in a score map of an applicable class among foreground classes, of the plurality of preset classes, indicating the symmetry element and recording pixels less related to the predetermined symmetry types in a score map corresponding to a background class, of the plurality of preset classes.

The detecting of the symmetry element of the input image may include detecting the symmetry element by integrating the score maps into one space.

In a general aspect, here is provided an apparatus including a processor configured to execute a plurality of instructions and a memory storing the plurality of instructions, wherein execution of the plurality of instructions configures the processor to be configured to train a neural network to generate a score map for each of a plurality of pre-set classes for predetermined symmetry types based on a feature map using a neural network and generate a heat map for an input image through the trained neural network based on the score map.

Other features and aspects will be apparent from the following detailed description, the drawings, and the claims.

Figure 1:
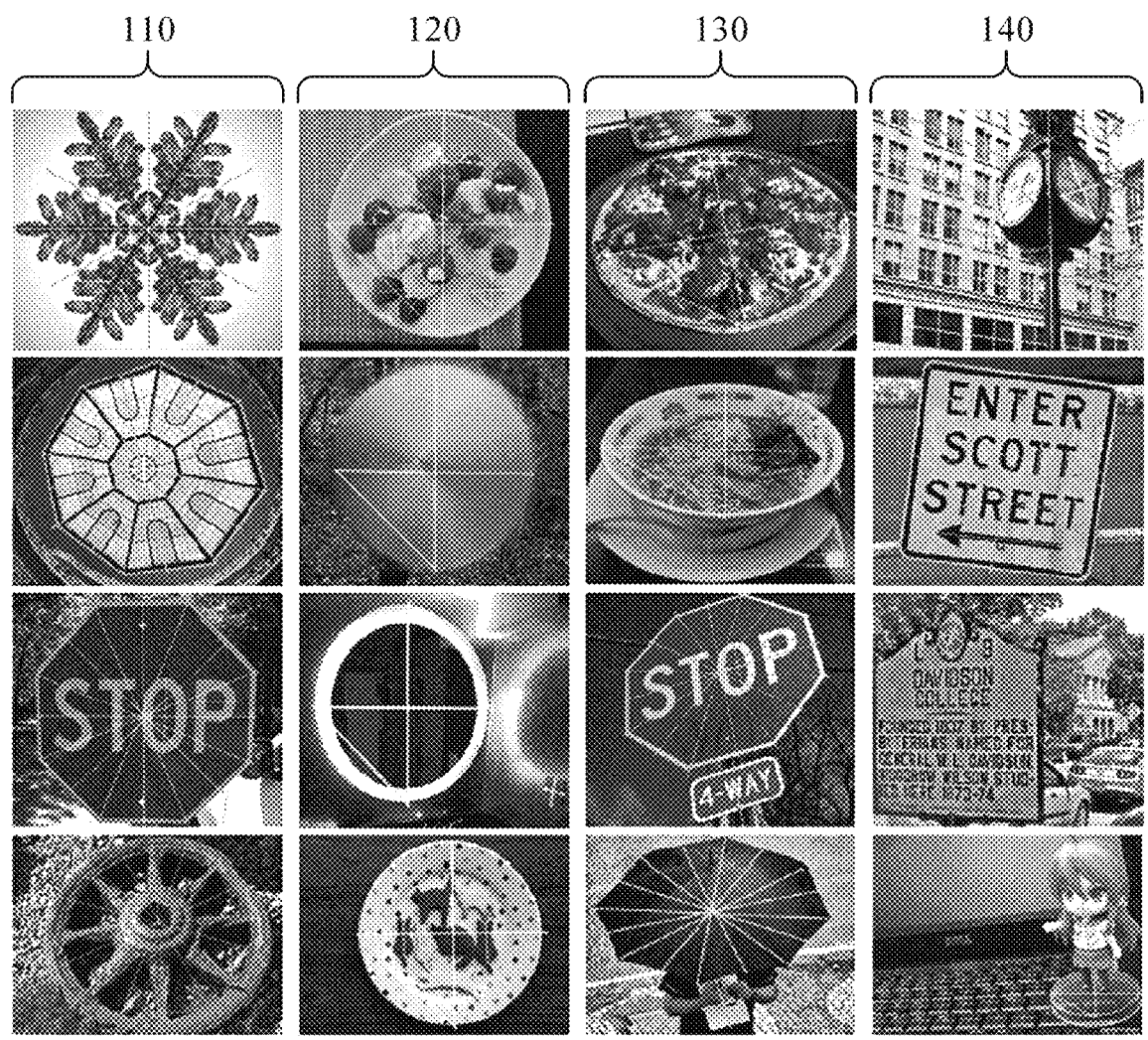
FIG. 1 illustrates examples of data sets including a reflection symmetry axis according to one or more embodiments.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Embodiments may include devices, such as an apparatus employing a neural network on a processor, capable of detecting an axis of reflection symmetry and an axis of rotational symmetry.

Methods based on convolutional neural network (CNN) may be used to detect reflection symmetry and rotational symmetry. However, conventional CNN approaches may need to derive equivariant results on the reflection and rotation of an image that may present issues for image classification or object detection. Conventional methods of symmetry detection may include a symmetric heat map that has had a direct regression applied to it.

Embodiments having a group equivariant convolution neural network (GECNN) may provide a natural generalization of a CNN that reduces sample complexity based on symmetry. Embodiments employing GECNN may increase the representation capacity of a network without increasing the number of parameters. A group convolution layer may be easy to use and implemented a small amount of computational overhead for individual groups generated by reflection and rotation.

FIG. 1 illustrates examples of a data sets 100 including a reflection symmetry axis according to one or more embodiments.

The reflection symmetry axis may be represented as a line within the data sets 100. The data sets 100 include different groups 110, 120, 130, and 140 that present different reflection symmetry axis conditions. For example, group 110 may be a data set of objects having multiple reflection symmetry axes. Group 120 may be an example of a data set including circular objects. Group 130 may be an example of a data set that includes objects on an incline having a reflection symmetry axis. Group 140 may be an example of a data set that includes a variety of objects with dense reflection symmetry axes.

Referring to group 110, the input images that make up these examples may include all reflection symmetry axes of a recognized object, including a dominant reflection symmetry axis and a non-dominant reflection symmetry axis. Unlike a general data set, symmetry information of a circular object having an infinite number of reflection symmetry axes may be included in a data set of group 110.

Group 120 provides examples of circular objects that may include an infinite number of reflection symmetry axes. To represent the reflection symmetry axes, a data set may be used that converts the infinite number of reflection symmetry axes into a circular mask by using a '4'-shaped label including 5 dots.

The '4'-shaped label may be included, as shown in the first and second rows of group 130 including a circular object that is, by definition, circular, which, however, may look elliptical due to change in a point of view. That is, group 130 includes images of objects that are slanted. Similarly, a regular polygon that is tilted may be labelled with the same reflectional axis as a regular polygon that is not tilted, as shown in the third and fourth rows of group 130. For example, a STOP sign may be, by definition, octagonal but in the image as presented at least in group 130, may have eight reflection symmetry axes.

In addition, as shown in group 140, labeling may be performed on objects that have unclear, or too thin, sets of characters, such as A, B, C, D, E, H, I, I, K, M, O, T, U, V, W, X, and Y, and characters not shown but including symmetry of numbers 0, 1, 2, 5, and 8. Labeling may be performed on symmetry in the D part of characters, such as P and R. When multiple symmetry axes overlap each other, a data set may be labeled with the longest axis.

Figure 2:
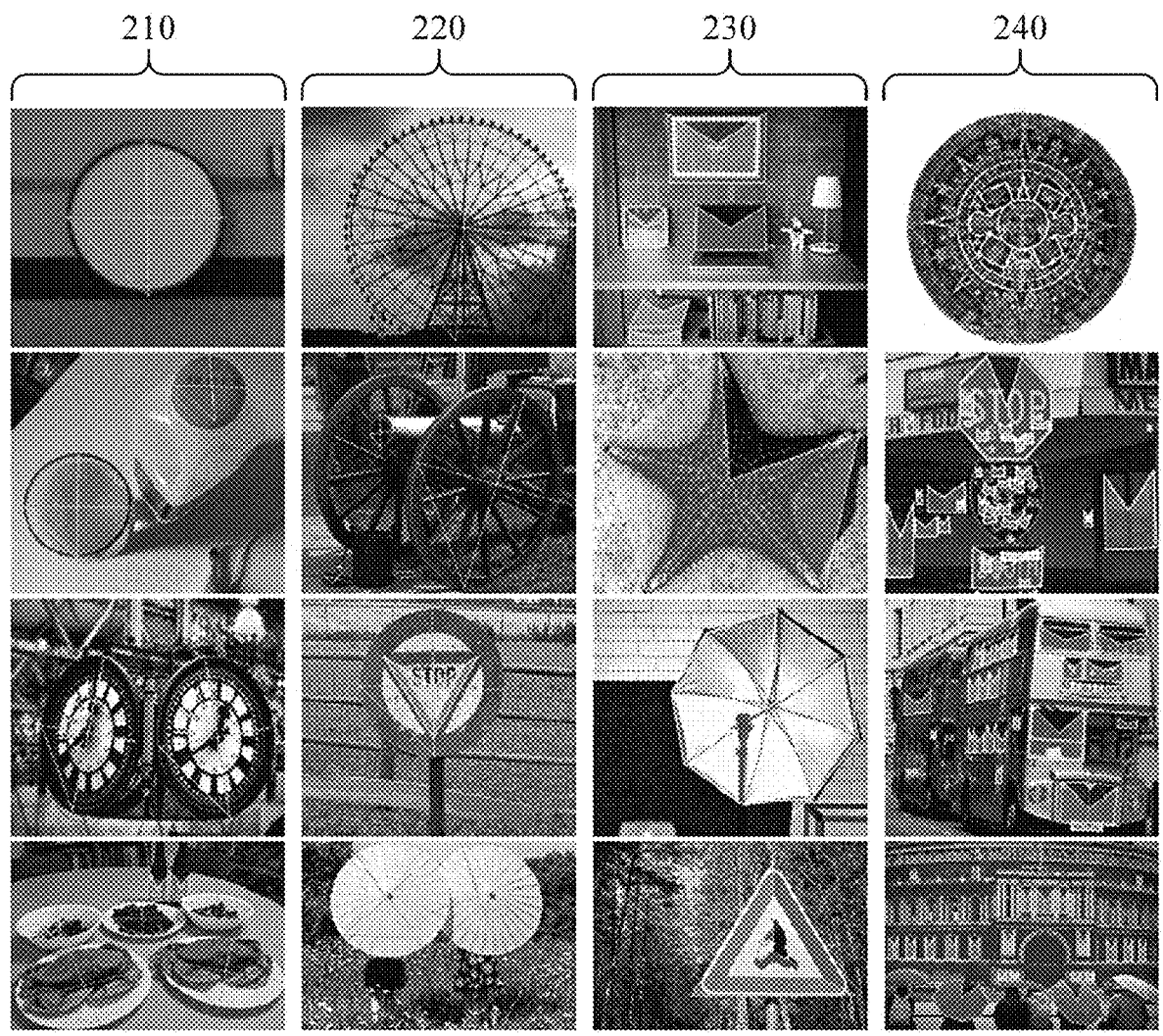
FIG. 2 illustrates examples data sets including a rotational symmetry point according to one or more embodiments.

FIG. 2 illustrates examples of a data set 200 including a rotational symmetry point according to one or more embodiments.

Referring to FIG. 2, group 210 of the data set 200 may be an example of a data set where circular objects have a rotational symmetry point. In group 220, two or more circular objects may be present in each of the images while in group 230, polygon examples are provided. Group 240 may include data sets having dense objects which include multiple rotational symmetry points.

Data that includes rotation center coordinates, a boundary, and the number (N) of rotation overlaps for each object having rotational symmetry may be labeled on each image within either, or both, of data sets 100 and 200 of FIGS. 1 and 2. Referring to group 210 of FIG. 2, a '4'-shaped label, as also shown in group data set 100 (e.g., group 120) of FIG. 1, may be used to indicate a circular or elliptical object. By definition, a circular object may have an infinite number of rotational overlapping points.

For a data set of non-circular objects having rotational symmetry, as shown in group 230, convex polygons may be drawn starting from the center of an object and following a convex vertex. Among convex vertices, a vertex closest to the 12 o'clock direction may take precedence.

In a data set having reflection symmetry, the rotational symmetry of characters, such as H, I, N, O, S, X, and Z, and numbers 0 and 8 may be taken into account.

Figure 3:
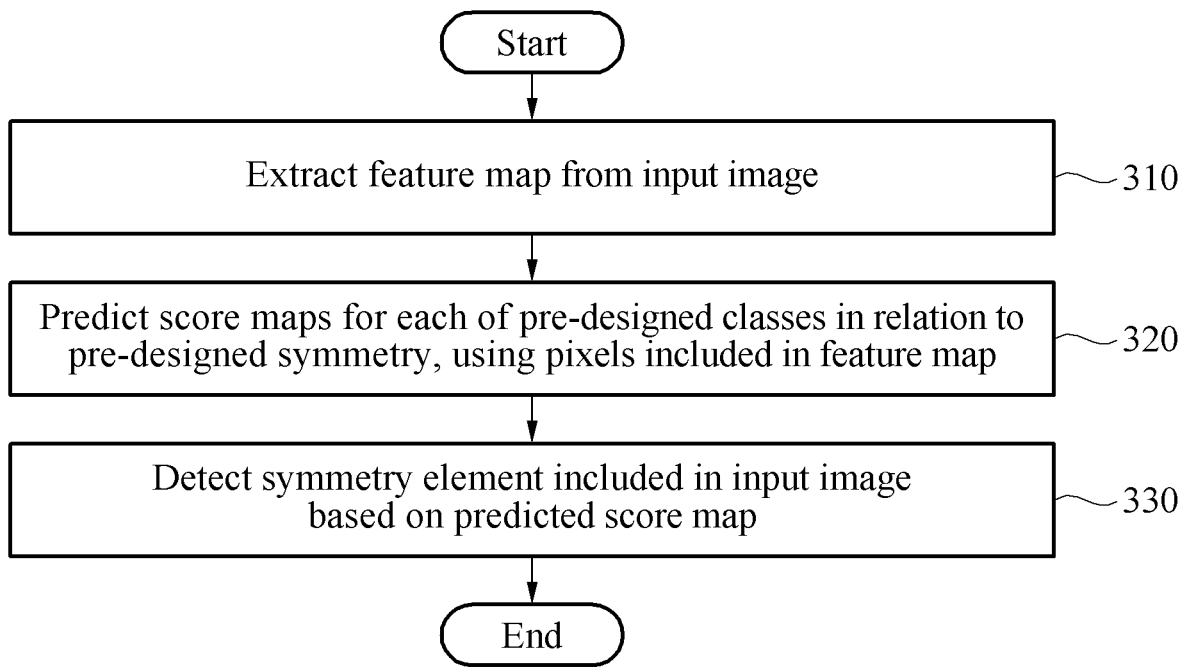
FIG. 3 illustrates an example operating method of an apparatus for symmetry detection according to one or more embodiments.

FIG. 3 illustrates an example operating method of an apparatus for symmetry detection according to one or more embodiments.

In a non-limiting example, an apparatus (e.g., apparatus 600 of FIG. 6) for symmetry detection according to an example may perform symmetry detection, using a group equivariant convolution neural network (GECNN).

In operation 310, the apparatus may extract a feature map from an input image.

In an example, the apparatus may extract a feature map from an input image, using a feature extractor having equivariance for a dihedral group. A dihedral group may refer to a number of symmetries that a shape possesses. These symmetries include rotations and reflections. For example, a regular polygon having n number of sides would have 2n symmetries, including an n amount of rotational symmetries and an n amount of reflection symmetries. In this case, the apparatus may extract the feature map from the input image by using the GECNN, and the extracted feature map may possess equivariance.

In operation 320, the apparatus may predict score maps for each of pre-set classes for a known (e.g., predetermined) type of symmetry, using a plurality of pixels included in the feature map. For example, the types of classes and types of symmetries may include the different symmetries and classes illustrated in FIGS. 1 and 2.

In an example, the extracted feature map may be input to one of a neural network trained to detect a reflection symmetry axis or a neural network trained to detect a rotational symmetry point. In an example, the apparatus may predict one or more score maps for detecting a reflection symmetry axis or a rotational symmetry point included in the feature map.

In an example, a network trained to detect reflection symmetry and rotational symmetry may be designed based on the GECNN, and the apparatus may predict a score map corresponding to a feature map input for each class. In an example, the number of classes for deriving optimal efficiency may be determined through training.

The reflection symmetry may include the plurality of classes for predicting the angle of a reflection symmetry axis for each section, and the apparatus may predict a reflection symmetry axis for each class corresponding to each section.

For example, the plurality of classes may be generated based on 180 degrees representing reflection symmetry, and each class may include an angle section indicating each class. In response to the input of the feature map to the network for reflection symmetry, a score map may be recorded as the class of a section corresponding to the inclined angle of a reflection symmetry axis detected by the input feature map.

For rotational symmetry, classes may be generated based on the number of points where rotational symmetry exists during rotation based on each rotation center, and the apparatus may predict rotational symmetry points for each class.

In an example, classes may be classified based on the number of times one point completely overlaps with another point during the completion of one rotation around a rotational symmetry point, and each class may indicate the number of overlaps. In response to the feature map input for rotational symmetry, a score map may be predicted based on a class corresponding to the number of overlaps during rotation detected in the feature map.

For example, when a feature map of an equilateral triangle is input to the network, the number of times the equilateral triangle is overlapped corresponds to a value of 3. That is, the triangle has the same shape on each side during a rotation. Therefore, the predicted score map d for the triangle may be a class indicating 3 (times). In the case of a regular hexagon, the number of overlaps during a rotation corresponds to 6, the score map for a class indicating 6 (times) may be predicted. In addition, because a regular hexagon may be counted as overlapping two times and three times, its predicted score maps may be two predetermined classes indicating 2 and 3, respectively.

In an example, score maps generated for symmetry detection may be extracted through a layer having equivariance and be recorded in each class, and each class may correspond to a tensor.

In an example, the plurality of classes may be pre-set, or known (i.e., predetermined), for each of type of reflection symmetry and rotational symmetry where the classes may include a plurality of foreground classes for recording a score map for pixels that are related to a symmetry quality and a background class for recording a score map for pixels that are less related to a symmetry quality.

For example, where there may be many classes related to reflection symmetry, each of the foreground classes may indicate an angle section with respect to a reflection symmetry axis. In addition, scores for pixels that are associated with a corresponding foreground class may be recorded in the foreground class. In addition, a score map for pixels that are less related to the plurality of foreground classes corresponding to the reflection symmetry may also be recorded in the background class.

In addition, for classes related to rotational symmetry, each foreground class may indicate a number of times a rotational symmetry point is overlapped. In addition, scores for pixels related to a corresponding foreground class may be recorded in the foreground class while a score map for pixels less related to the plurality of foreground classes corresponding to rotational symmetry may be recorded in the background class.

In operation 330, the apparatus (e.g., apparatus 600 of FIG. 6) may detect a symmetry element included in the input image based on the predicted score maps.

In an example, the score maps predicted for each of reflection symmetry and rotation symmetry may be integrated into one space. For example, the apparatus may integrate the foreground classes for detecting a reflection symmetry point into one space and the foreground classes for detecting a rotational symmetry point into one space, respectively.

In an example, the GECNN may be applied to an integrated result. Through the GECNN, final heat maps for reflection symmetry and rotation symmetry, respectively, may be obtained.

In an example, a heat map that detects reflection symmetry and a heat map that detects a rotational symmetry may both be output for the input image.

In a non-limiting example, a neural network may be trained to perform symmetry detection through a GECNN. One issue that may arise when detecting reflection symmetry, and rotational symmetry using equivariance training, is the fact that the direction of a symmetrical pattern is arbitrarily derived.

Reflection symmetry may mirror itself about an axis in a specific direction whereas rotational symmetry may match a copy rotated in a specific direction. Thus, when such a symmetric pattern in an image is identified, an equivariant feature that changes consistently according to the reflection and rotation of an image may be represented. A trained neural network may use an equivariance feature map for the dihedral group of reflection and rotation. The trained neural network may be trained to be built end-to-end with dihedral-equivariant layers and to output a space map about a reflection symmetry axis or a rotational symmetry point.

Figure 4:
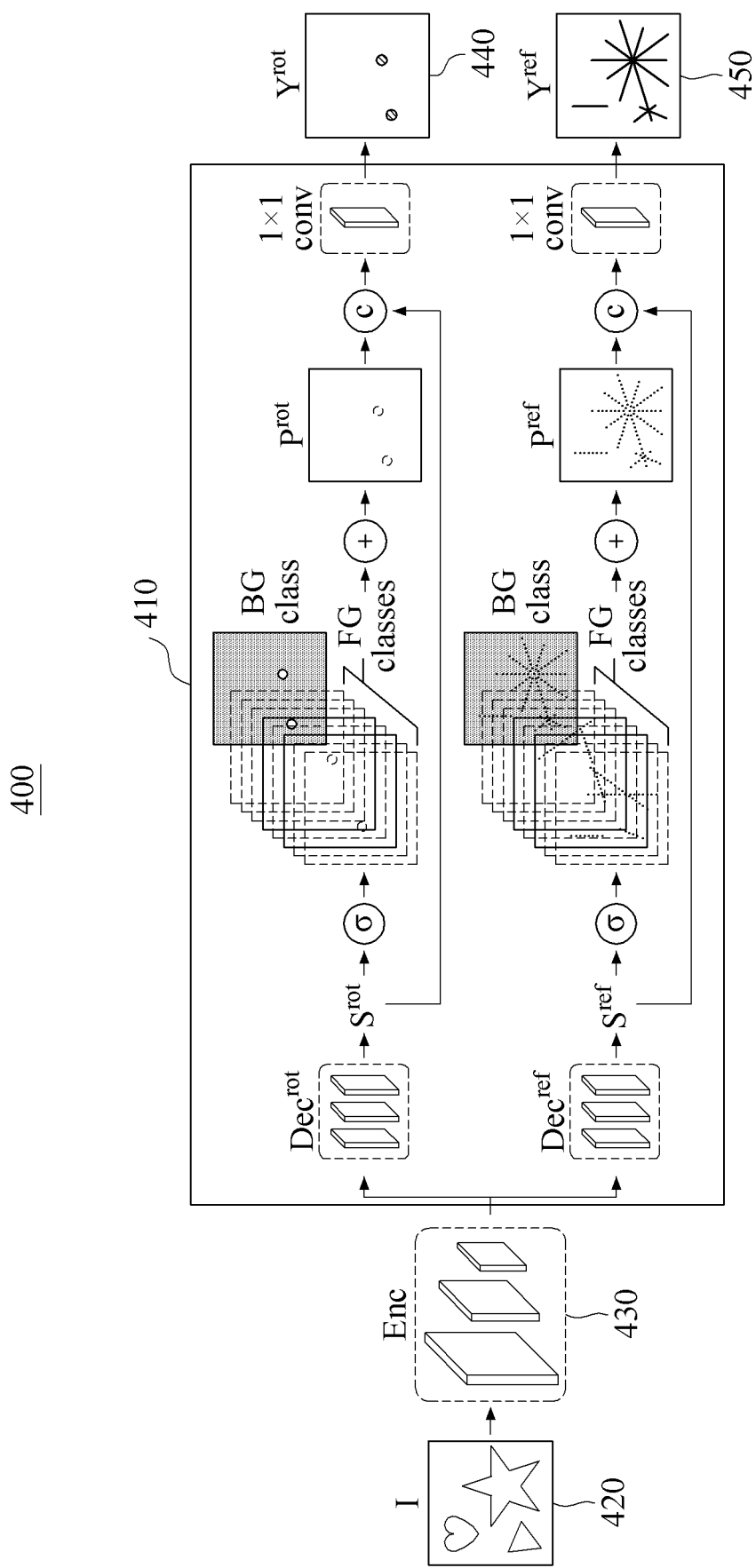
FIG. 4 illustrates an example structure of a neural network trained for symmetry detection according to one or more embodiments.

FIG. 4 illustrates an example structure of a neural network trained for symmetry detection according to one or more embodiments.

In an example, the equivariant convolution network of a dihedral group $D_N$ including N number of discrete rotations and reflections may be applied to a neural network 400 in order to detect both a reflection symmetry and a rotation symmetry. As a non-limiting example, the neural network 400 may include an encoder (Enc) 430 may include a ResNet network and an Atrous Spatial Pyramid Pooling (ASPP) network, and a decoder (Dec). The decoder may include 3-layer convolution, as a non-limiting example.

While examples herein may refer to various neural network examples, examples are not limited thereto as any one of such operations may be implemented through alternative machine learning models.

For example, the convolution may be replaced with equivariant convolution.

A final heat map may be generated after performing an auxiliary task 410. In an example, the auxiliary task 410 of generating a heat map for an input image may be accomplished through neural networks that are trained for detecting a reflection symmetry axis and for detecting a rotational symmetry point.

Each of the networks may record score maps for detecting each of reflection symmetry and rotational symmetry as described above with reference to FIG. 3, based on pixel-unit classification according to the tilted angle of a symmetry reflection axis and pixel-unit classification according to the number of rotation overlaps.

The auxiliary tasks 410 for reflection symmetry and rotation symmetry may each predict score maps for $N^{re}+1$ number of channels and $N^{ro}+1$ number of channels including a background class. When an input image 420 is I, logit $S \in R^{(H \times W \times (N+1))}$ for symmetry detection may be obtained as follows.

$$S = Dec(Enc(I)) \qquad \text{Equation 1:}$$

In this case, an encoder may be shared for both of reflection symmetry and rotational symmetry, and a decoder may have a weight according to each of the reflection symmetry and rotational symmetry.

As described above, the neural network 400 may be trained to predict a final heat map, as described in greater detail below, by passing score maps through a 1×1 convolutional layer in which pixels excluding background classes are recorded, in order for reflection symmetry and rotational symmetry. Here, the convolution layer may correspond to a group equivariance convolution layer.

$$P_{h,w} = \sum_{k=1}^{N} \frac{\exp(S_{h,w,k})}{\sum_c \exp(S_{h,w,c})}, \qquad \text{Equation 2}$$

$$Y = conv_G([P][S]).$$

Here, ∥ may denote concatenation in a channel direction. The neural network 400 according to an example may be trained by using a final loss and an intermediate loss. A final heat map Y may use focal loss, and an intermediate prediction layer S may use cross entropy loss.

During training, reflection symmetry and rotational symmetry may be trained separately, so that data sets for the two types of symmetry may be formed differently. For example, a loss may be calculated only for a branch having ground truth, and the same number of images for two types of symmetry may be included in a mini batch during joint training of the two networks.

According to an example, the trained neural network 400 may predict the score map of a reflection symmetry axis 450 and/or the score map of a rotational symmetry point 440, for an input image.

In a non-limiting example, the symmetry detection may be evaluated with an F1 score. The F1 score may be calculated based on a precision and recall of the symmetry detection.

Figure 5:
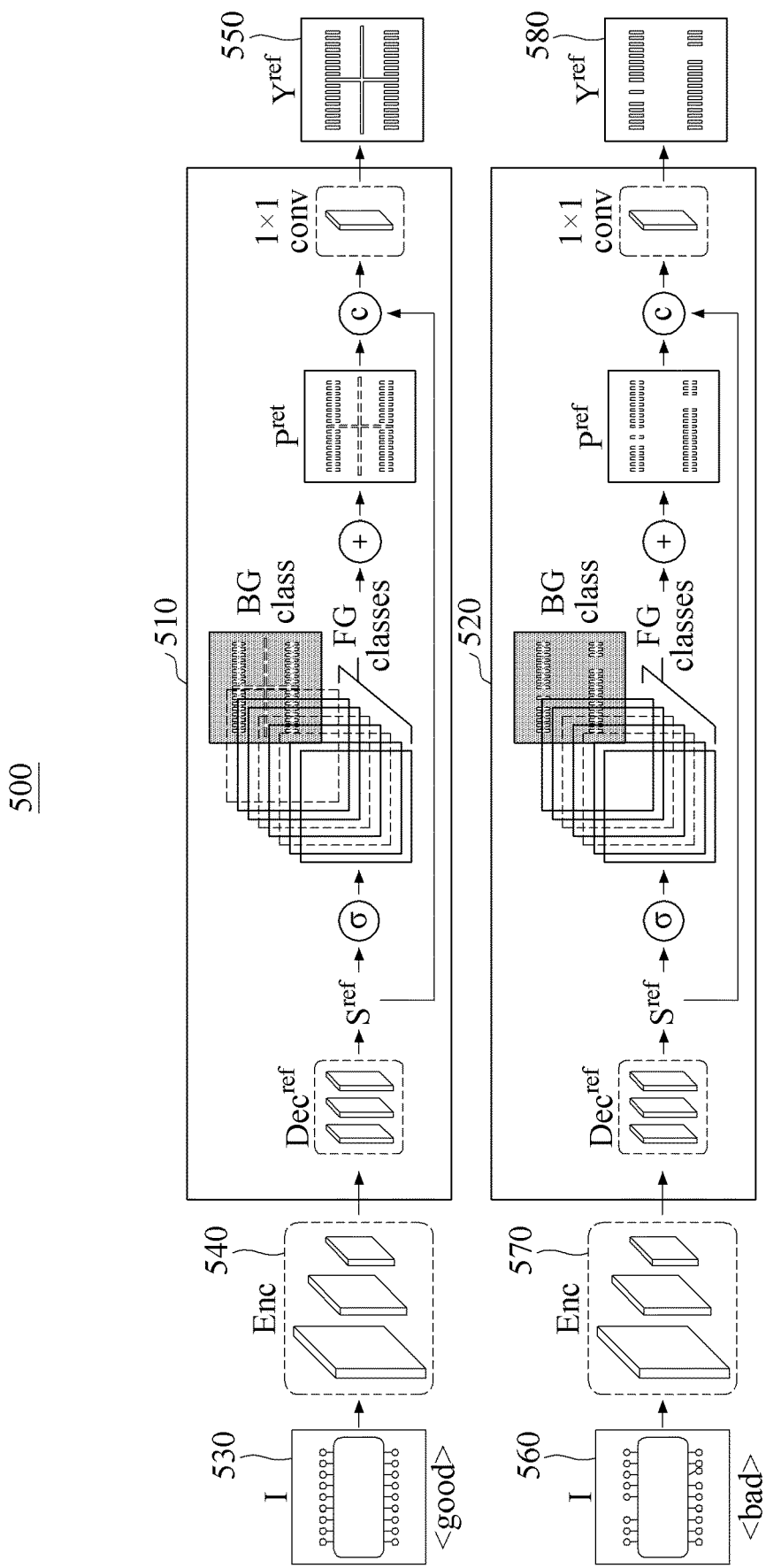
FIG. 5 illustrates an example method of detecting abnormality of a workpiece, using a trained neural network according to one or more embodiments.

FIG. 5 illustrates an example method of detecting abnormality of a workpiece, using a trained neural network according to one or more embodiments.

Referring to method 500 of FIG. 5, a first neural network 510 and second neural network 520 are trained for symmetry detection and may be used to inspect one or more manufactured workpieces. In one example, the first neural network 510 and the second neural network 520 may be examples of the same neural network processing two different images 530 and 560. For example, the first neural network 510 and the second neural network 520 may both be trained on a type of class, or object, related to the input images 530 and 560 where the resulting heat maps 550 and 580 provide a symmetry score indicating whether the respective images 530 and 560 pass an inspection protocol. Thus, image 530 is of a object receiving a "passing" score based on its symmetry while image 560 is of an inspected object that has a failing level of symmetry.

Thus, the first neural network 510 and the second neural network 520 illustrate examples in which two different results 550 and 580 (e.g., heat maps) are respectively produced. Workpieces manufactured in large quantities may often have a symmetry axis and it may be necessary to measure a symmetry score for these workpieces to determine a quality of each workpiece. These workpieces would each be an example image provided to the trained neural networks to be inspected for their symmetry levels.

In a first example, a method of detecting a reflection symmetry axis for an image I 530 provided to an encoder Enc 540 corresponding to a workpiece being evaluated is illustrated with respect to first neural network 510. In this example an auxiliary task for detecting a reflection symmetry axis is illustrated. In an example, a heat map 550 related to the image I 530 of the workpiece being evaluated is provided by the first neural network 510.

In an example, for training of the neural networks, the training may be accomplished where a heat map that has performed symmetry detection for a workpiece of which a symmetry detection process has been successfully completed is obtained, that heat map may be employed as a ground truth value. In addition, a heat map that has performed symmetry detection may be obtained by inputting some samples of workpieces actually manufactured to the same neural network.

The neural network may extract a feature map from the image of a workpiece and predict score maps for each of a plurality of pre-set classes in relation to symmetry of a plurality of pixels included in the feature map. The neural network may obtain a heat map integrating the predicted score maps into one to detect a symmetry element included in an input image and may detect a symmetry element each for rotational symmetry and reflectional symmetry of a workpiece based on the pre-set classes and the known type of symmetry.

In an example, as illustrated in FIG. 5, a second heat map 580 is output from the second neural network 520. In the second example, a second image I 560 of another workpiece may be considered in an effort to detect a defect. In the resulting heat map 580, a lack of symmetry is illustrated as the image I 560 is of a "bad" workpiece with a low symmetry value that was provided to encoder Enc 570. For example, the two heat maps 550 and 580 output from the first neural network 510 and the second neural network 520 may provide a visualization which may to perform image registration on these images. That is, the visualized heat maps 550 and 580 may be recorded and used to implement an inspection process. Accordingly, the two images I 530 and 560 may be compared via their respective neural networks 510 and 520, and then a defect, if any, in the considered workpieces may be detected based on their respective comparison results. In this example, heat map 580 would illustrate a failure.

Figure 6:
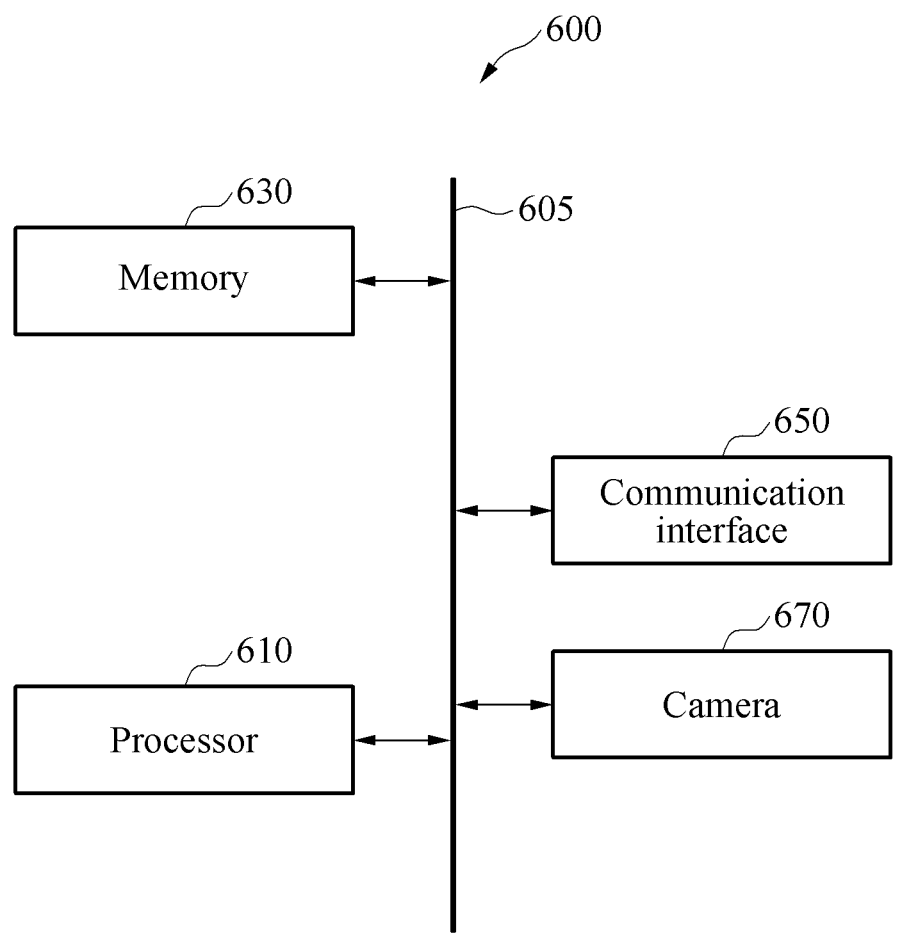
FIG. 6 illustrates an example of a structure of an apparatus for detecting symmetry.

FIG. 6 illustrates an example structure of an apparatus for detecting symmetry according to one or more embodiments.

In an example, an apparatus 600 may include processors (i.e., one or more processors) 610, a memory 630, a communication interface 650, and a camera or imaging device 670.

The processors 610, or another processor, may be configured to control the apparatus 10, and may include any one or a combination of two or more of, for example, a central processing unit (CPU), a graphic processing unit (GPU), a neural processing unit (NPU) and tensor processing units (TPUs), but is not limited to the above-described examples.

Thus, the apparatus 600 may obtain, by execution of such instructions, for example, by the processors 610, a result of obtaining a reflection symmetry axis and/or a rotational symmetry point for an input image.

The processors 610 according to an example may perform symmetry detection through a pretrained neural network.

The processors 610, according to an example, may be configured to perform operations including extracting a feature map from an input image, predicting score maps for each of a plurality of pre-set classes in relation to known types of symmetry by using a plurality of pixels included in the feature map, and detecting a symmetry element included in the input image based on the predicted score maps. In a non-limiting example, the apparatus may include the imaging device 670 which may provide images, such as images of the workpieces of FIG. 5, for example, to the processors 610.

The memory 630 may include computer-readable instructions. The processors 610 may be configured to execute computer-readable instructions, such as those stored in the memory 630, and through execution of the computer-readable instructions, the processor 610 is configured to perform one or more, or any combination, of the operations and/or methods described herein. The memory 630 may be a volatile or nonvolatile memory.

The apparatus 600 may be connected to an external device (e.g., a personal computer (PC) or a network) through an input/output device (not shown) to exchange data therewith. The apparatus 600 may be mounted on various computing devices and/or systems such as a smartphone, a tablet computer, a laptop computer, a desktop computer, a television (TV), a wearable device, a security system, a smart home system, and the like.

The processors, neural networks, memory, apparatuses, apparatus 600, processors 610, memory 630, interface 650, first neural network 510, second neural network 520, and neural network 400 described herein and disclosed herein described with respect to FIGS. 3-6 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor implemented method, the method comprising:
   predicting, using machine learning models, score maps for each of a plurality of pre-set classes for predetermined symmetry types, using a plurality of pixels of a feature map extracted from an input image; and
   detecting a symmetry element within the input image based on the predicted score maps,
   wherein multiple classes, of the plurality of preset classes, for detecting a reflection symmetry axis are each classified based on an angle forming the reflection symmetry axis,
   wherein multiple classes, of the plurality of preset classes, for detecting a rotational symmetry point are each classified based on a number of times a rotational symmetry point overlaps during rotation of the rotational symmetry point.

2. The method of claim 1, further comprising extracting the feature map from the input image using a trained equivariant convolution neural network, wherein the machine learning model is another neural network.

3. The method of claim 1, wherein the symmetry element comprises one of a rotational symmetry point and a reflection symmetry axis.

4. The method of claim 3, wherein multiple classes, of the plurality of preset classes, for detecting the reflection symmetry axis are each classified based on an angle forming the reflection symmetry axis.

5. The method of claim 3, wherein multiple classes, of the plurality of preset classes, for detecting the rotational symmetry point are each classified based on a number of times a rotational symmetry point overlaps during rotation of the rotational symmetry point.

6. The method of claim 1, wherein the predicting of the score maps for each of the plurality of pre-set classes comprises:
   predicting the score maps for each of classes, of the plurality of preset classes, presenting a detection of a reflection symmetry axis in the symmetry element; and
   predicting the score maps for each of classes, of the plurality of preset classes, presenting a detection of a feature symmetry point in the symmetry element.

7. The method of claim 1, wherein the predicting of the score maps for each of the plurality of pre-set classes comprises:
   recording determined pixels related to the predetermined symmetry types in a score map of an applicable class among foreground classes, of the plurality of preset classes, indicating the symmetry element; and
   recording pixels less related, compared to the pixels determined to be related to the predetermined symmetry types, to the predetermined symmetry types in a score map corresponding to a background class, of the plurality of preset classes.

8. The method of claim 1, wherein the detecting of the symmetry element within the input image comprises detecting the symmetry element by integrating the score maps into one space.

9. A processor-implemented method, the method comprising:
   predicting score maps for each of a plurality of pre-set classes for predetermined symmetry types based on a plurality of pixels of a feature map extracted from a training image using a first network portion of a neural network, using a second network portion of the neural network;
   detecting, using a third network portion of the neural network that is distinct from the first network portion and the second network portion, a symmetry element within the training image based on the predicted score maps; and
   training one of the first network portion, the second network portion, and the third network portion by comparing a symmetry element labeled with respect to the training image to the detected symmetry element, wherein multiple classes, of the plurality of preset classes, for detecting a reflection symmetry axis are each classified based on an angle forming the reflection symmetry axis, wherein multiple classes, of the plurality of preset classes, for detecting a rotational symmetry point are each classified based on a number of times a rotational symmetry point overlaps during rotation of the rotational symmetry point.

10. The method of claim 9, wherein the symmetry element comprises one or more of a rotational symmetry point and a reflection symmetry axis.

11. The method of claim 10, wherein the plurality of pre-set classes are each classified based on an angle forming the reflection symmetry axis, on a basis of a task detecting the reflection symmetry axis.

12. The method of claim 10, wherein the plurality of pre-set classes are each classified based on a number of times a rotational symmetry point overlaps during rotation of the rotational symmetry point, on a basis of a task detecting the rotational symmetry points.

13. The method of claim 9, wherein the predicting of the score maps for each of the plurality of pre-set classes comprises:
 recording pixels related to the predetermined symmetry types in a score map of an applicable class among foreground classes indicating the symmetry element; and
 recording pixels less related to the predetermined symmetry types in a score map corresponding to a background class.

14. The method of claim 9, wherein the neural network comprises an equivariant convolution neural network.

15. An apparatus, the apparatus comprising:
 a processor configured to execute a plurality of instructions; and
 a memory storing the plurality of instructions, wherein execution of the plurality of instructions configures the processor to be configured to:
  predict, using a machine learning model, score maps for each of a plurality of pre-set classes of predetermined symmetry types, using a plurality of pixels of a feature map derived from an input image; and
  detect, using another machine learning model, a symmetry element of the input image, based on the predicted score maps,
 wherein multiple classes, of the plurality of preset classes, for detecting a reflection symmetry axis are each classified based on an angle forming the reflection symmetry axis,
 wherein multiple classes, of the plurality of preset classes, for detecting a rotational symmetry point are each classified based on a number of times a rotational symmetry point overlaps during rotation of the rotational symmetry point.

16. The apparatus of claim 15, wherein the deriving of the feature map from the input image comprises extracting the feature map from the input image using a trained equivariant convolution neural network.

17. The apparatus of claim 15, wherein the symmetry element comprises one or more of a rotational symmetry point and a reflection symmetry axis.

18. The apparatus of claim 17, wherein the plurality of pre-set classes are each classified based on an angle forming the reflection symmetry axis, on a basis of a task detecting the reflection symmetry axis.

19. The apparatus of claim 17, wherein the plurality of pre-set classes are each classified based on a number of times a rotational symmetry point overlap during rotation of the rotational symmetry point, on a basis of a task detecting the rotational symmetry points.

20. The apparatus of claim 15, wherein the predicting of the score maps for each of the plurality of pre-set classes comprises:
 predicting the score maps for each of classes, of the plurality of preset classes, presenting a detection of a reflection symmetry axis in the symmetry element; and
 predicting the score maps for each of classes, of the plurality of preset classes, presenting a detection of a feature symmetry point in the symmetry element.

21. The apparatus of claim 15, wherein the predicting of the score maps for each of the plurality of pre-set classes comprises:
 recording pixels determined to be related to the predetermined symmetry types in a score map of an applicable class among foreground classes, of the plurality of preset classes, indicating the symmetry element; and
 recording pixels less related to the predetermined symmetry types in a score map corresponding to a background class, of the plurality of preset classes.

22. The apparatus of claim 15, wherein the detecting of the symmetry element of the input image comprises detecting the symmetry element by integrating the score maps into one space.

23. An apparatus, the apparatus comprising:
 a processor configured to execute a plurality of instructions; and
 a memory storing the plurality of instructions, wherein execution of the plurality of instructions configures the processor to be configured to:
  train a neural network to generate a score map for each of a plurality of pre-set classes for predetermined symmetry types based on a feature map using a neural network; and
  generate a heat map for an input image through the trained neural network based on the score map,
 wherein multiple classes, of the plurality of preset classes, for detecting a reflection symmetry axis are each classified based on an angle forming the reflection symmetry axis,
 wherein multiple classes, of the plurality of preset classes, for detecting a rotational symmetry point are each classified based on a number of times a rotational symmetry point overlaps during rotation of the rotational symmetry point.

* * * * *